(12) United States Patent
Seo et al.

(10) Patent No.: US 10,928,662 B2
(45) Date of Patent: Feb. 23, 2021

(54) DISPLAY APPARATUS INCLUDING SIDE SEALING MEMBER AND SEALING COMPOSITION USED THEREIN

(71) Applicant: Samsung Display Co., Ltd., Yongin-Si (KR)

(72) Inventors: Woosuk Seo, Yongin-si (KR); Yong-hoon Kwon, Hwaseong-si (KR); Seokhyun Nam, Seoul (KR); Byoungdae Ye, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 357 days.

(21) Appl. No.: 15/647,366

(22) Filed: Jul. 12, 2017

(65) Prior Publication Data

US 2018/0017826 A1 Jan. 18, 2018

(30) Foreign Application Priority Data

Jul. 14, 2016 (KR) ........................ 10-2016-0089413

(51) Int. Cl.
*G02F 1/1333* (2006.01)
*G02F 1/1339* (2006.01)
*G02F 1/13357* (2006.01)

(52) U.S. Cl.
CPC .. *G02F 1/133308* (2013.01); *C09K 2323/057* (2020.08); *G02F 1/1339* (2013.01); *G02F 1/133615* (2013.01)

(58) Field of Classification Search
CPC ......... G02F 1/133308; G02F 1/133615; G02F 1/1339; Y10T 428/1077; C09K 2323/057
See application file for complete search history.

(56) References Cited

U.S. PATENT DOCUMENTS

| | | | | |
|---|---|---|---|---|
| 4,063,002 A | * | 12/1977 | Wilson, Jr. | C03C 27/048 428/34 |
| 6,407,146 B1 | * | 6/2002 | Fujita | C08F 8/42 522/100 |
| 6,713,165 B1 | * | 3/2004 | Karsten | B32B 27/08 428/213 |
| 9,182,535 B2 | | 11/2015 | Lee et al. | |
| 2006/0089450 A1 | * | 4/2006 | Jansen | C03C 25/106 524/555 |
| 2006/0138947 A1 | * | 6/2006 | MacPherson | H01L 27/3251 313/506 |
| 2008/0170179 A1 | * | 7/2008 | Shiraishi | G02B 6/0055 349/65 |
| 2009/0167171 A1 | * | 7/2009 | Jung | H01L 51/5237 313/504 |

(Continued)

FOREIGN PATENT DOCUMENTS

| | | |
|---|---|---|
| KR | 1020090022121 A | 3/2009 |
| KR | 1020120112430 A | 10/2012 |
| KR | 1020130106507 A | 9/2013 |

(Continued)

*Primary Examiner* — Sophie Hon
(74) *Attorney, Agent, or Firm* — Cantor Colburn LLP

(57) ABSTRACT

A display apparatus includes a display panel which displays an image with light; and a side sealing member which is configured to block the light. The side sealing member contacts at least one side surface of the display panel to cover the one side surface. The side sealing member has an elongation of about 100% to about 300% inclusive.

15 Claims, 12 Drawing Sheets

(56) References Cited

U.S. PATENT DOCUMENTS

2011/0194037 A1* 8/2011 Hirabayashi ...... G02F 1/133308
　　　　　　　　　　　　　　　　　　　　　349/5
2012/0211080 A1* 8/2012 Niiyama ............. C08F 290/067
　　　　　　　　　　　　　　　　　　　　　136/259

FOREIGN PATENT DOCUMENTS

| KR | 20140069673 A | * | 6/2014 |
| KR | 1020140069673 A | | 6/2014 |
| KR | 20140141165 A | * | 12/2014 |
| KR | 1020140141165 A | | 12/2014 |
| KR | 1020150015087 A | | 2/2015 |

* cited by examiner

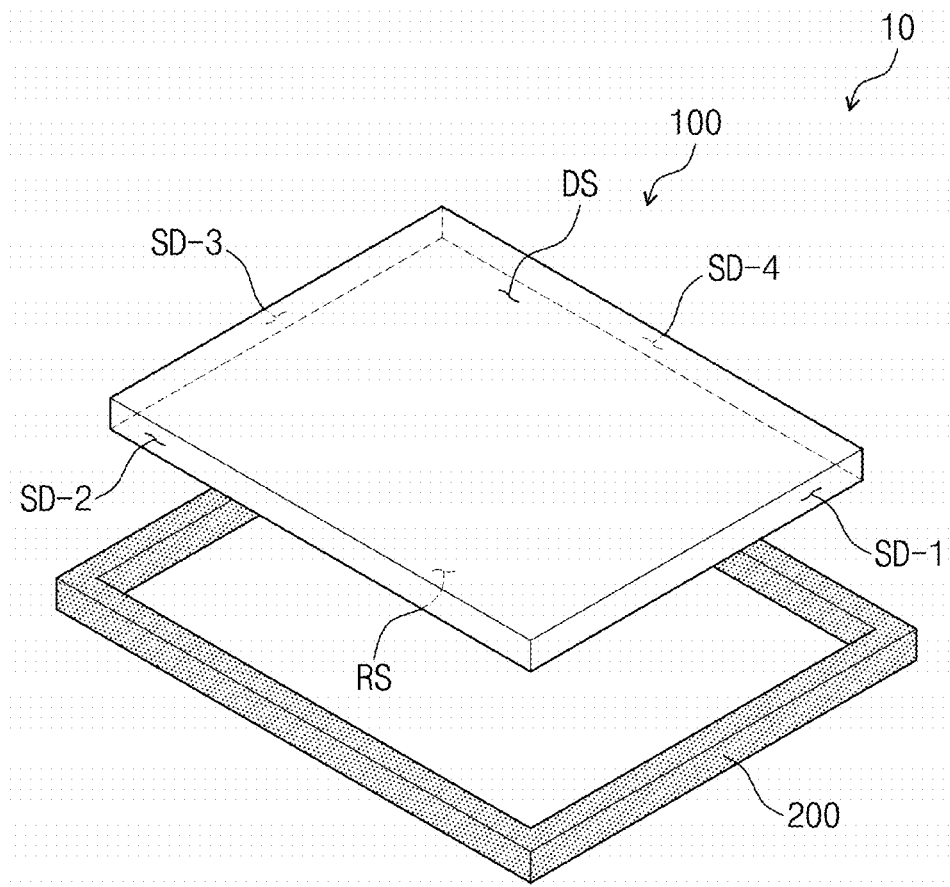

DISPLAY APPARATUS INCLUDING SIDE SEALING MEMBER AND SEALING COMPOSITION USED THEREIN

This application claims priority to Korean Patent Application No. 10-2016-0089413, filed on Jul. 14, 2016, and all the benefits accruing therefrom under 35 U.S.C. § 119, the content of which in its entirety is incorporated by reference.

BACKGROUND

(1) Field

The present disclosure herein relates to a display apparatus including a side sealing member, and more particularly, to a display apparatus including a side sealing member capable of improving productivity in manufacturing such display apparatus.

(2) Description of the Related Art

Display apparatuses are used to display an image for various apparatuses such as televisions, monitors, lap-top computers and mobile phones. Display apparatuses having narrow bezels have been developed to increase immersion levels of users and realize an elegant design. Display apparatuses being relatively lightweight and small-sized have also been pursued. Accordingly, display apparatuses for which a conventional cover glass and a top cover are omitted have been developed to address the above issues as well as to reduce overall material costs and improve manufacturing thereof.

SUMMARY

The present disclosure provides a display apparatus for which productivity in manufacturing thereof is improved and material costs are reduced.

An embodiment of the invention provides a display apparatus including a display panel which displays an image with light and a side sealing member which is configured to block the light. The side sealing member contacts at least one side surface of the display panel to thereby cover the one side surface. The side sealing member has an elongation of about 100% to about 300% inclusive.

In an embodiment, the display panel may include: a display surface at which the image is displayed; a rear surface facing the display surface; and the side surface connecting the display surface and the rear surface to each other. The side surface may be provided in plural and include a first surface, a second surface, a third surface and a fourth surface. The side sealing member may contact each of the first surface, the second surface, the third surface and the fourth surface to cover each of the first surface, the second surface, the third surface and the fourth surface.

In an embodiment, the side sealing member may include an oligomer, a first monomer, a second monomer and a third monomer. The second monomer may be different from the first monomer. The third monomer may be different from each of the first and second monomers.

In an embodiment, the oligomer may include a urethane group. The first monomer may include an isobornyl group. The second monomer may include a furfuryl group. The third monomer may include a phosphineoxide group.

In an embodiment, the first monomer may include isobornyl acrylate ("IBOA"). The second monomer may include tetrahydrofurfuryl acrylate ("THFA"). The third monomer may include diphenyltrimethylbenzoyl phosphineoxide.

In an embodiment, the side sealing member may further include carbon black.

In an embodiment, the side sealing member may include about 45 to about 60 parts by weight of the oligomer, about 25 to about 40 parts by weight of the first monomer, about 5 to about 20 parts by weight of the second monomer, and about 1 to about 5 parts by weight of the third monomer, based on 100 parts by weight of the side sealing member.

In an embodiment, the side sealing member including the oligomer, the first monomer, the second monomer different from the first monomer and the third monomer different from each of the first and second monomers may have a peel strength of about 1600 N/m to about 2100 N/m.

In an embodiment, the side sealing member including the oligomer, the first monomer, the second monomer different from the first monomer and the third monomer different from each of the first and second monomers may have a shear adhesion strength of about 7.5 $N/mm^2$ to about 9 $N/mm^2$.

In an embodiment, the display panel may include a first substrate which defines a display surface of the display panel at which the image is displayed and a second substrate which is on the first substrate and defines a rear surface of the display panel opposite to the display surface thereof. The first substrate may include an upper surface, a lower surface facing the upper surface, and a first side surface, a second side surface, a third side surface and a fourth side surface each connecting the upper and lower surfaces of the first substrate to each other. The second substrate may include an upper surface, a lower surface facing the upper surface, and a first side surface, a second side surface, a third side surface and a fourth side surface each connecting the upper and lower surfaces of the second substrate to each other. The side sealing member may contact at least one of the first side surface of the first substrate and the first side surface of the second substrate to cover at least one of the first side surface of the first substrate and the first side surface of the second substrate.

In an embodiment, in a top plan view, the first substrate may include a first substrate portion overlapping the second substrate; and a second substrate portion not overlapping the second substrate. In the top plan view, the side sealing member may be spaced apart from the first substrate portion and may contact the first side surface of the first substrate to cover the first side surface of the first side surface.

The display apparatus according to an embodiment of the invention may further include a flexible wiring substrate attached to a lower surface of the second substrate portion. In the top plan view, the side sealing member may further cover a portion of the flexible wiring substrate attached to the second substrate portion of the first substrate.

The display apparatus according to an embodiment of the invention may further include a bottom chassis in which the display panel is accommodated. The bottom chassis may include: a bottom portion parallel to the display panel; and a side wall extending in a direction perpendicular to the bottom portion. The side wall may include a first side wall portion, a second side wall portion, a third side wall portion and a fourth side wall portion. The side sealing member may be between the first side surface and the inner surface of the first side wall portion and contact the first side surface and the inner surface of the first side wall portion to cover the first side surface and a portion of the inner surface of the first side wall portion.

The display apparatus according to an embodiment of the invention may further include a first polarizing plate on the display surface of the display panel; and a second polarizing plate on the rear surface of the display panel. In a top plan view, the first polarizing plate may include a first polarizing portion overlapping the display panel, and a second polarizing portion not overlapping the display panel. The side sealing member which contacts and covers the side surface of the display panel may be further contacted by the second polarizing portion.

In an embodiment, the display panel may include: a base substrate; an organic light-emitting device on the base substrate; and an encapsulation layer on the organic light-emitting device. The base substrate may include a first side surface, a second side surface, a third side surface and a fourth side surface. The first side surface of the base substrate and a portion of the encapsulation layer may collectively define the side surface of the display panel which is contacted by the side sealing member.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 1C is a schematic exploded perspective view illustrating another embodiment of a partial configuration of a display apparatus according to the invention;

DETAILED DESCRIPTION

Figure 1A:
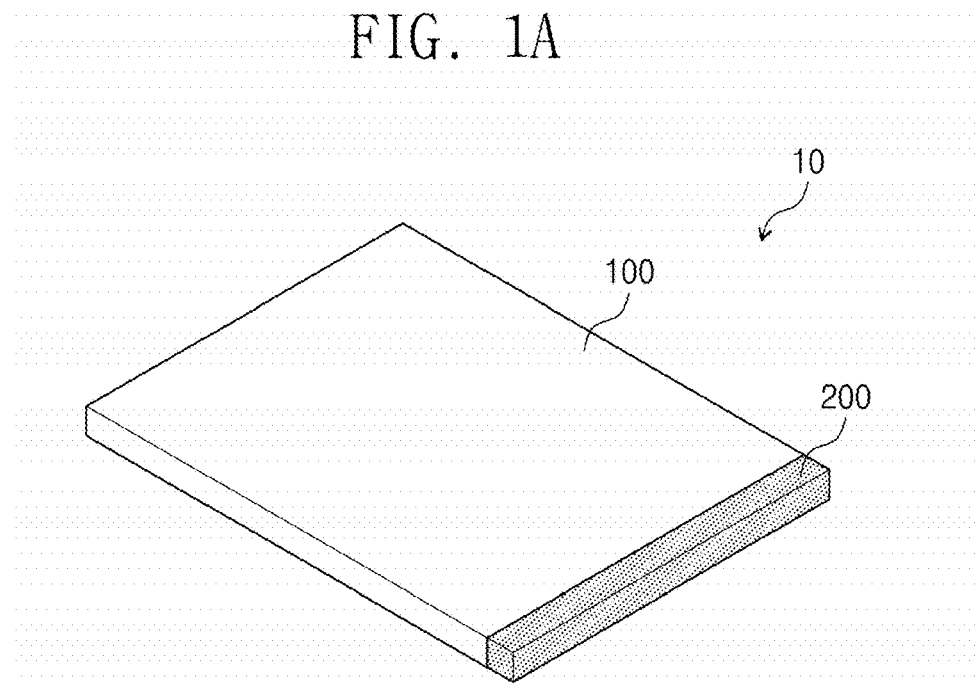
FIG. 1A is a perspective view illustrating an embodiment of a partial configuration of a display apparatus according to the invention.

The objects, other objectives, features, and advantages of the invention will be understood without difficulties through embodiments below related to the accompanying drawings. The invention may, however, be embodied in different forms and should not be construed as limited to the embodiments set forth herein. Rather, these embodiments are provided so that this disclosure will be thorough and complete, and will fully convey the scope of the invention to those skilled in the art.

In describing the drawings, like reference numerals refer to like elements throughout. In the drawings, the dimension and size of each structure are exaggerated, omitted, or schematically illustrated for convenience in description and clarity.

It will be understood that although the terms of first and second are used herein to describe various elements, these elements should not be limited by these terms. Terms are only used to distinguish one component from other components. For example, an element referred to as a first element in one embodiment can be referred to as a second element in another embodiment.

The terms of a singular form may include plural forms unless referred to the contrary. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

In the specification, the meaning of 'include' or 'comprise' specifies a property, a numeral, a step, an operation, an element or a combination thereof, but does not exclude other properties, numerals, steps, operations, elements or combinations thereof.

In addition, it will be understood that when a layer, a film, a region, or a plate is referred to as being 'on' or related to another layer, region, film, or plate, it can be directly on or related to the other layer, film, region, or plate, or intervening layers, films, regions, or plates may also be present. On the contrary, it will be understood that when a layer, a film, a region, or a plate is referred to as being 'under' or related to another layer, region, or plate, it can be directly under or related to the other layer, film, region, or plate, or intervening layers, films, regions, or plates may also be present. In contrast, when an element is referred to as being "directly" related to another element, layer, a film, a region, or a plate there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a display apparatus according to an embodiment of the invention will be described.

Figure 1B:
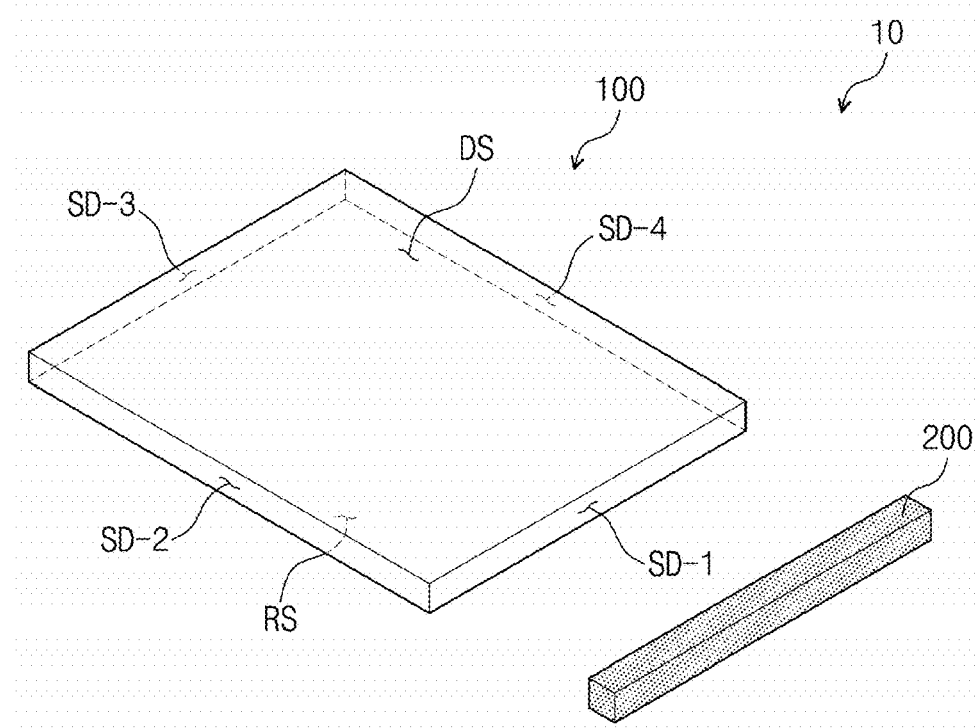
FIG. 1B is an exploded perspective view of the partial configuration of the display apparatus illustrated in FIG. 1A.

FIG. 1A is a perspective view illustrating an embodiment of a partial configuration of a display apparatus according to the invention. FIG. 1B is an exploded perspective view of the partial configuration illustrated in FIG. 1A. FIG. 1C is a schematic exploded perspective view illustrating another embodiment of a partial configuration of a display apparatus according to the invention.

Referring to FIGS. 1A to 1C, a display apparatus 10 according to an embodiment of the invention includes a display panel 100 and a side sealing member 200.

The display panel 100 displays an image in response to electrical signals. The image may be generated within the display panel 100 to be displayed thereby in response to the electrical signals. Hereinafter, for convenience of description, in the display panel 100, a direction in which an image is provided is defined as an upper direction and the reverse direction to the upper direction is defined as a lower direction. The display panel 100 is not specifically limited, and, for example, an organic light-emitting display panel, a liquid crystal display panel, a plasma display panel, an electrophoretic display panel, an electrowetting display panel, etc., may be applied as the display panel 100.

The display panel 100 may include a display surface DS at which the image is displayed or is viewable, and a rear surface RS facing the display surface DS. The display surface DS and the rear surface RS may be connected to each other, such as by being connected to a plurality of side surfaces SD-1, SD-2, SD-3 and SD-4. Specifically, the display panel 100 may include a first side surface SD-1, a second side surface SD-2, a third side surface SD-3 and a fourth side surface SD-4.

When viewed in a plane, such as from the upper direction (e.g., a top plan view), the overall shape and the size of the display panel 100 is not limited and may be provided in various forms. However, the display panel 100 in FIGS. 1A and 1B is exemplarily illustrated as an overall rectangular shape when viewed in the top plan view. With reference to FIGS. 1A and 1B, display panel 100 includes relatively long sides extended in a first direction, relatively short sides extended in a second direction which crosses the first direction, and a thickness extended in a third direction (e.g., from the display surface DS to the rear surface RS) which crosses each of the first and second directions. The display panel 100 and the side sealing member 200 may be disposed adjacent to each other in a plane defined by the first and second directions.

A side sealing member 200 contacts at least one side surface of the display panel 100 and thereby covers the side surface. Specifically, the side sealing member 200 may contact the first side surface SD-1 of the display panel 100 to thereby cover the first side surface SD-1.

To cover the first side surface SD-1, a planar size of the side sealing member 200 may be equal to or greater than a planar size of the first side surface SD-1, such that an entirety of the planar size of the first side surface SD-1 is overlapped by the side sealing member 200. Planar sizes may be taken in a plane parallel to that in which the first side surface SD-1 is disposed. Further, to cover the first side surface SD-1, the side sealing member 200 is disposed between the first side surface SD-1 through which light may be leaked and an exterior of the display apparatus 10 to block light leaked at the first side surface from reaching the exterior of the display apparatus 10.

Referring to FIGS. 1A and 1B, the first side surface SD-1 may be disposed in a plane defined by the second and third directions. The length of the first side surface SD-1 extends in the second direction while a height thereof extends in the third direction. A total planar area of the first side surface SD-1 may be a product of the entirety of the length and an entirety of the height. A surface of the side sealing member 200 is disposed in a plane parallel to that in which the first side surface SD-1 is disposed. The length of the contacting surface of the side sealing member 200 extends in the second direction while a height thereof extends in the third direction. A total planar area of the contacting surface of the side sealing member 200 may be a product of the entirety of the length and an entirety of the height. The total planar area of the contacting surface of the side sealing member 200 may be equal to or greater than that of the first side surface SD-1 such that the first side surface SD-1 covers the contacting surface of the side sealing member 200.

FIGS. 1A and 1B illustrate that the side sealing member 200 contacts only the first side surface SD-1 of the display panel 100 to thereby cover the first side surface SD-1, but the invention is not limited thereto. As illustrated in FIG. 1C, a side sealing member 200 may contact all of the side surfaces of a display panel 100. Referring to FIGS. 1A and 1B, for example, the side sealing member 200 may cover each of the first side surface SD-1, the second side surface SD-2, the third surface SD-3 and the fourth side surface SD-4 of the display panel 100. As such, the side sealing member 200 may collectively have a shape surrounding the display panel 100 when viewed in a top plan view.

In an embodiment of manufacturing a display apparatus, the side sealing member 200 has an elongation of about 100% to about 300% inclusive. Such elongation means a percentage of an original length of the formed side sealing member 200 during manufacturing thereof. When the elongation is less than about 100%, residue of the side sealing member 200 may be generated during reprocessing thereof to thereby degrade productivity of the manufacturing. When the elongation is greater than about 300%, the stability of the side sealing member 200 may be degraded.

In an embodiment, the side sealing member 200 may include materials of an oligomer, a first monomer, a second monomer and a third monomer. The second monomer may be different from the first monomer. The third monomer may be different from each of the first and second monomers.

The oligomer functions as a binder in the side sealing member 200. The oligomer may include an acrylate group and may form the side sealing member 200 by a photocuring reaction with the first monomer, the second monomer and the third monomer in a method of manufacturing a display apparatus, which will be described later. The oligomer may include a urethane-based compound. A urethane-based compound means a compound in which a urethane group is included in the structure of the compound. More specifically, the oligomer may include urethane acrylate.

The first monomer functions to control the viscosity of a material for forming the side sealing member 200. The first monomer may dilute the oligomer to thereby function to decrease the viscosity of the side sealing member 200. The first monomer may include an isobornyl-based compound. An isobornyl-based compound means a compound in which an isobornyl group is included in the structure of the compound. The first monomer may include isobornyl acrylate ("IBOA").

The second monomer functions to control the elongation and the hardness of a material for forming the side sealing member 200. The second monomer functions to control the elongation and the hardness of the material for forming the side sealing member 200 by adjusting a curing reaction in a method of manufacturing a display apparatus. The second monomer may include a furfuryl-based compound. A furfuryl-based compound means a compound in which a furfuryl group is included in the structure of the compound. The second monomer may include tetrahydrofurfuryl acrylate ("THFA").

The third monomer functions to start a curing reaction for a material in forming the side sealing member 200. The third monomer may include a phosphineoxide-based compound. A phosphineoxide-based compound means ae compound in which a phosphineoxide group is included in the structure of the compound. The third monomer may include diphenyltrimethylbenzoyl phosphineoxide.

One or more embodiment of the side sealing member 200 of the display apparatus 10 according to the invention may further include a pigment for blocking light. The pigment in the side sealing member 200 functions to block light such that leaking from the display panel 100 is reduced. The color of the pigment may be selected as a color the same as the color of a polarizing plate (310 and 320 of FIG. 4) which is exposed to outside the display apparatus 10. More specifically, the side sealing member 200 may include carbon black. The side sealing member 200 may include acetylene black.

Based on a total weight of the side sealing member 200 is 100 (parts by weight), the side sealing member 200 may include about 45 to about 60 parts by weight of the oligomer, about 25 to about 40 parts by weight of the first monomer, about 5 to about 20 parts by weight of the second monomer, and about 1 to about 5 parts by weight of the third monomer. The side sealing member 200 may include about 0.1 to about 1 part by weight of carbon black with respect to 100 parts by weight of the total weight of the side sealing member 200.

The oligomer content may be about 45 to about 60 parts by weight with respect to 100 parts by weight of the total weight of the side sealing member 200. When the oligomer content is less than about 45 parts by weight, forming the side sealing member 200 with a sufficient thickness may be difficult, and when the oligomer content is greater than about 60 parts by weight, obtaining an appropriate viscosity of the material for forming the side sealing member 200 may be difficult.

The content of the first monomer may be about 25 to about 40 parts by weight with respect to 100 parts by weight of the total weight of the side sealing member 200. When the content of the first monomer is less than about 25 parts by weight, processibility of the material for forming the side sealing member 200 may be degraded due to the relatively high viscosity of the side sealing member 200, and when the content of the first monomer is greater than about 40 parts by weight, forming the side sealing member 200 with a sufficient thickness may be difficult.

The content of the second monomer may be about 5 to about 20 parts by weight with respect to 100 parts by weight of the total weight of the side sealing member 200. When the content of the second monomer is less than about 5 parts by weight, productivity in manufacturing the display apparatus may be degraded due to a relatively low elongation of the side sealing member 200, and when the content of the second monomer is greater than about 20 parts by weight, photocuring of the material for forming the side sealing member 200 does not sufficiently progress and thereby, the stability of the formed side sealing member 200 may be degraded.

The content of the third monomer may be about 1 to about 5 parts by weight with respect to 100 parts by weight of the total weight of the side sealing member 200. When the content of the third monomer is less than about 1 part by weight, photocuring of the material for forming the side sealing member 200 may not sufficiently progress, and when the content of the third monomer is greater than about 5 parts by weight, the flexibility and the elongation of the formed side sealing member 200 may be decreased.

The side sealing member 200 according to one or more embodiment including the above composition components has a peel strength of the side sealing member 200 may be about 1600 newton/meter (N/m) to about 2100 N/m inclusive. The peeling strength may mean the average load per unit width of an attached interface surface when a flexible member and another member which are attached to each other are separated. The term "flexible" means a property of being bent and may include all from a completely folded structure to a structure bendable in a several-nanometer level.

The side sealing member 200 according to one or more embodiment including the above composition components may have a shear adhesion strength of about 7.5 newton per square millimeter (N/mm$^2$) to about 9 N/mm$^2$ inclusive. The shear adhesion strength may mean the average load per unit area when an adherently bonded part is cut by a shear stress applied to an adhesion surface.

Figure 2:
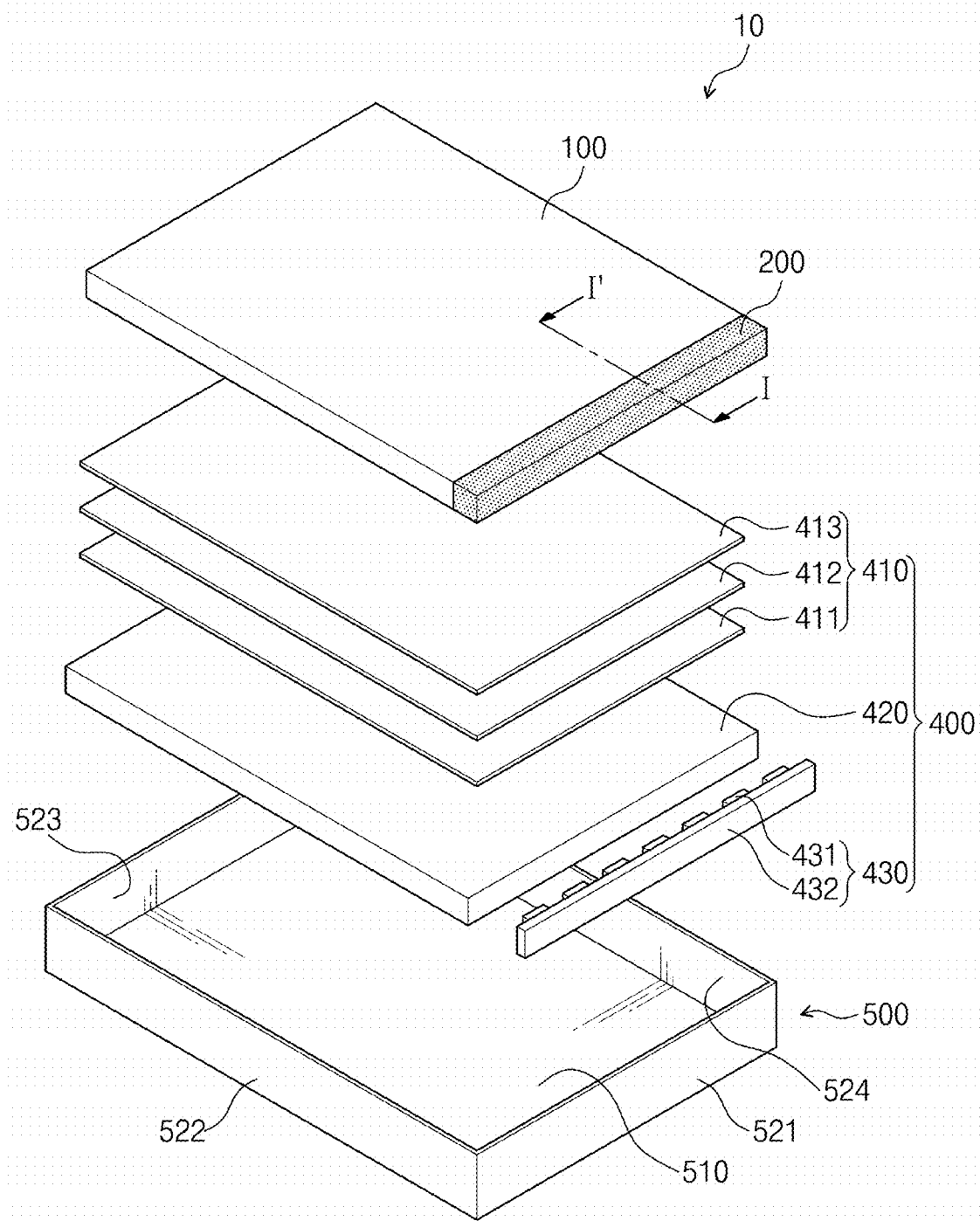
FIG. 2 is an exploded perspective view of an embodiment of a display apparatus according to the invention.

FIG. 2 is an exploded perspective view of an embodiment of a display apparatus according to the invention.

Referring to FIG. 2, a display apparatus 10 includes a display panel 100, a side sealing member 200, a backlight unit 400 and a bottom chassis 500.

The display apparatus 10 may be any one of a liquid crystal display apparatus, an electro wetting display apparatus, an electrophoretic display apparatus, a micro electromechanical system ("MEMS") display apparatus, or an organic light-emitting display apparatus. In the illustrated embodiment, a liquid crystal display apparatus will be exemplarily described.

The display panel 100 provides an image and may also generate the image. The display panel 100 may have an overall rectangular plate shape including two pairs of sides. In the illustrated embodiment, the display panel 100 may have a rectangular shape including one pair of long sides each extended in a first direction, and one pair of short sides each extended in a second direction which crosses the first direction. The display panel 100 may include a display region at which the image is displayed and a non-display region at which no image is displayed. The display region and the non-display region together may define an entirety of the display panel 100, such as in the top plan view.

The side sealing member 200 is provided at a side surface (among SD-1, SD-2, SD-3 and SD-4 of FIG. 1B) of the display panel 100 to reduce or effectively prevent a light leaking phenomenon at such side surface. The side sealing member 200 includes a light blocking material and thereby reduces or effectively prevents light provided from the backlight unit 400 from being emitted not toward (e.g., away from) a display surface (DS of FIG. 1B) but toward the side surface (among SD-1, SD-2, SD-3 and SD-4 of FIG. 1B). In embodiment, a cover glass and/or a top cover are omitted from the display apparatus 10, such that the side sealing member 200 or another component of the display apparatus 10 may form an outer element or form an outer surface of the overall display apparatus 10, but the invention is not limited thereto.

The backlight unit 400 generates and provides light to the display panel 100. The backlight unit 400 may be disposed under the display panel 100. The backlight unit 400 may include optical sheets 410, a light guide plate 420 and a light-emitting unit 430.

The optical sheets 410 may be disposed between the display panel 100 and the light-emitting unit 430 and/or the light guide plate 420. The optical sheets 410 function to control the path of light emitted from the light-emitting unit 430 and/or the light guide plate 420. The optical sheets 410 may include a diffusion sheet 411, a prism sheet 412 and a protective sheet 413. The diffusion sheet 411 diffuses light. The prism sheet 412 functions to collect light diffused by the diffusion sheet 411 so that the collected light is oriented substantially perpendicular to the plane in which the display panel 100 is disposed. The protective sheet 413 is disposed on the prism sheet 412. The protective sheet 413 protects the prism sheet 412 from an external shock thereto.

In the illustrated embodiment, an example in which the optical sheets 410 include one diffusion sheet 411, one prism sheet 412 and one protective sheet 413, but the invention is not limited thereto.

In another embodiment of the invention, the optical sheets 410 may include at least one of the diffusion sheet 411, the prism sheet 412 or the protective sheet 413 is overlapped in plurality, and may include any one or more of the sheets being omitted.

The light-emitting unit 430 generates light. FIG. 2 illustrates that one single light-emitting unit 430 is disposed adjacent to one side surface of a light guide plate 420, but the invention is not limited thereto, and the light-emitting unit 430 may be disposed adjacent to more than one side surface among the side surfaces of the light guide plate 420. Light generated from the light-emitting unit 430 may be incident to the light guide unit 420 through one or more side surface of the light guide plate 420, and the light incident to the light guide plate 420 may be guided within the light guide plate 420 to be emitted from the light guide plate 420 toward the display panel 100. The light-emitting unit 430 may include one or more light source such as a light-emitting diode 431 for generating light, and a printed circuit board 432 on which the light source is disposed. In an embodiment the light-emitting diode 431 is provided in plurality mounted on the printed circuit board 432.

FIG. 2 exemplifies an example in which the light-emitting unit 430 is disposed adjacent to a side surface of the light guide plate 420, but the invention is not limited thereto. In an embodiment, the light-emitting unit 430 may include one or more of the light source is disposed on a bottom part (or portion) 510 of the bottom chassis 500. In an embodiment, the light-emitting diode 431 is provided in plurality in a matrix shape on the bottom part 510 of the bottom chassis 500 to overlap the light guide plate 420 in the top plan view. In such a case, the light guide plate 420 may be replaced by a diffusing plate.

The bottom chassis 500 may include the bottom part 510 and a collective side wall 520 (refer to FIG. 8) extending from the bottom part 510. The collective side wall 520 of the bottom chassis 500 may include a first side wall part (or portion) 521, a second side wall part 522, a third side wall part 523 and a fourth side wall part 524. The side wall parts 521, 522, 523 and 524 may each extend upward (e.g., in the third direction) from the bottom part 510 and may be disposed along the periphery or edge of the bottom part 510.

FIGS. 1A to 2 show a flat rigid display device as a representative example of the display apparatus 10, but it should not be limited thereto or thereby. For example, the display apparatus may be a flexible display device. The display apparatus may be a bendable display device, a foldable display device or a rollable display device. The display apparatus may be a curved rigid display device.

Figure 3:
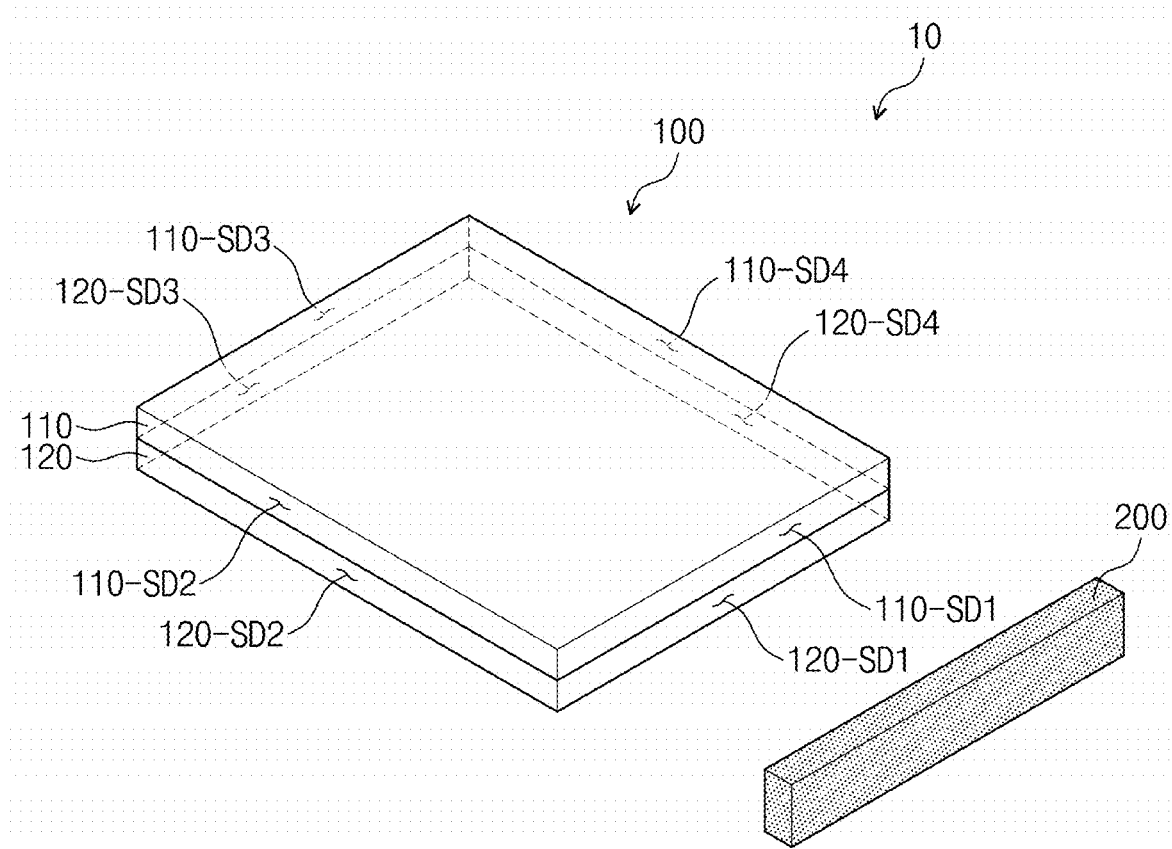
FIG. 3 is an exploded perspective view illustrating an embodiment of a partial configuration of the display apparatus illustrated in FIG. 2.

FIG. 3 is an exploded perspective view illustrating an embodiment of a partial configuration of the display apparatus illustrated in FIG. 2.

The display panel 100 may include a first substrate 110, a second substrate 120 which faces the first substrate 110, and an optical medium layer (not shown) such as a liquid crystal layer disposed between the first substrate 110 and the second substrate 120. The first and/or second substrates 110 and 120 may include at least any one of a glass substrate, a sapphire substrate or a plastic substrate. The first and/or second substrates 110 and 120 may be configured such that light transmits therethrough.

The first substrate 110 may include a first side surface 110-SD1, a second side surface 110-SD2, a third side surface 110-SD3 and a fourth side surface 110-SD4. The second substrate 120 may include a first side surface 120-SD1, a second side surface 120-SD2, a third side surface 120-SD3 and a fourth side surface 120-SD4. FIG. 3 exemplarily illustrates an example in which the side sealing member 200 is provided adjacent to the first side surface 110-SD1 of the first substrate 110 and the first side surface 120-SD1 of the second substrate 120, but the invention is not limited thereto. In an embodiment, the side sealing member 200 may be provided in plural respectively adjacent to each of the first side surface 110-SD1, the second side surface 110-SD2, the third side surface 110-SD3 and the fourth side surface 110-SD4 of the first substrate 110, and respectively to each of the first side surface 120-SD1, the second side surface 120-SD2, the third side surface 120-SD3 and the fourth side surface 120-SD4 of the second substrate 120. The first side surfaces 110-SD1 and 120-D1, the second side surfaces 110-SD2 and 120-D2, the third side surfaces 110-SD3 and 120-D3, and the fourth side surfaces 110-SD4 and 120-D4, may respectively define first, second, third and fourth side surfaces of a display panel 110 (SD-1, SD-2, SD-3 and SD-4 of FIGS. 1A through 1C, for example).

Figure 4:
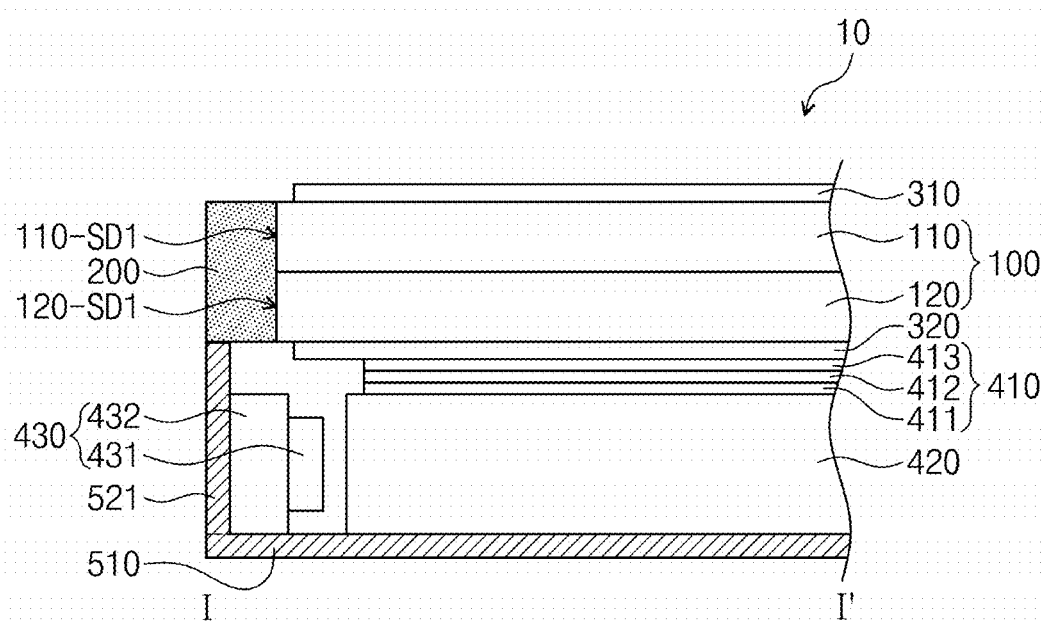
FIG. 4 is a schematic cross-sectional view of an embodiment of the display apparatus taken along line I-I' of FIG. 2.

FIG. 4 is a schematic cross-sectional view of an embodiment of the display apparatus taken along line I-I' of FIG. 2. FIGS. 5 to 8 are schematic cross-sectional views of modified embodiments of the display apparatus taken along line I-I' according to the invention.

Referring to FIG. 4, a display apparatus 10 according to an embodiment of the invention includes a display panel 100, a side sealing member 200, a first polarizing plate 310, a second polarizing plate 320, optical sheets 410, a light guide plate 420, a light-emitting unit 430 and a bottom chassis 500.

The first polarizing plate 310 and the second polarizing plate 320 may be respectively attached to opposing outer surfaces of the display panel 100. The first polarizing plate 310 may be attached to a display surface (DS of FIG. 1B) of the display panel 100, and the second polarizing plate 320 may be attached to a rear surface (RS of FIG. 1B) of the display panel 100. The first polarizing plate 310 may be attached to an outer surface of the first substrate 110 and the second polarizing plate 320 be attached to an outer surface of the second substrate 120. The first polarizing plate 310 and the second polarizing plate 320 may selectively transmit light having a specific wavelength range from among light provided from the backlight unit 400.

The side sealing member 200 may contact at least one side surface of the display panel 100 to thereby cover the one side surface. The side sealing member 200 may contact a first side surface (SD-1 of FIG. 1B) of the display panel 100 to thereby cover the first side surface SD-1. The side sealing member 200 may contact each of the first side surface 110-SD1 of the first substrate 110 and the first side surface 120-SD1 of the second substrate 120 to thereby cover each of the first side surface 110-SD1 of the first substrate 110 and the first side surface 120-SD1 of the second substrate 120.

FIG. 4 exemplarily illustrates an example in which the side sealing member 200 contacts each of the first side surface 110-SD1 of the first substrate 110 and the first side surface 120-SD1 of the second substrate 120 to thereby cover each of the first side surface 110-SD1 of the first substrate 110 and the first side surface 120-SD1 of the second substrate 120, but the invention is not limited thereto. In an embodiment, the side sealing member 200 may have a shape in which the side sealing member 200 may contact any one of the first side surface 110-SD1 of the first substrate 110 and the first side surface 120-SD1 of the second substrate 120 to thereby cover any one of the first side surface 110-SD1 of the first substrate 110 and the first side surface 120-SD1 of the second substrate 120, or cover only a portion of the first side surface 110-SD1 of the first substrate 110 and/or the first side surface 120-SD1 of the second substrate 120.

The side sealing member 200 may function to alleviate an external shock which may be applied to the display panel 100. Also, the side sealing member 200 may cover one or more of the side surfaces (SD-1, SD-2, SD-3 and SD4 of FIG. 1B) to thereby reduce or effectively prevent a light leaking phenomenon in which light provided form the backlight unit 400 is emitted not toward the display surface (DS of FIG. 1B) but toward the side surfaces (SD-1, SD-2, SD-3 and SD4 of FIG. 1B) of the display panel 100.

Figure 5:
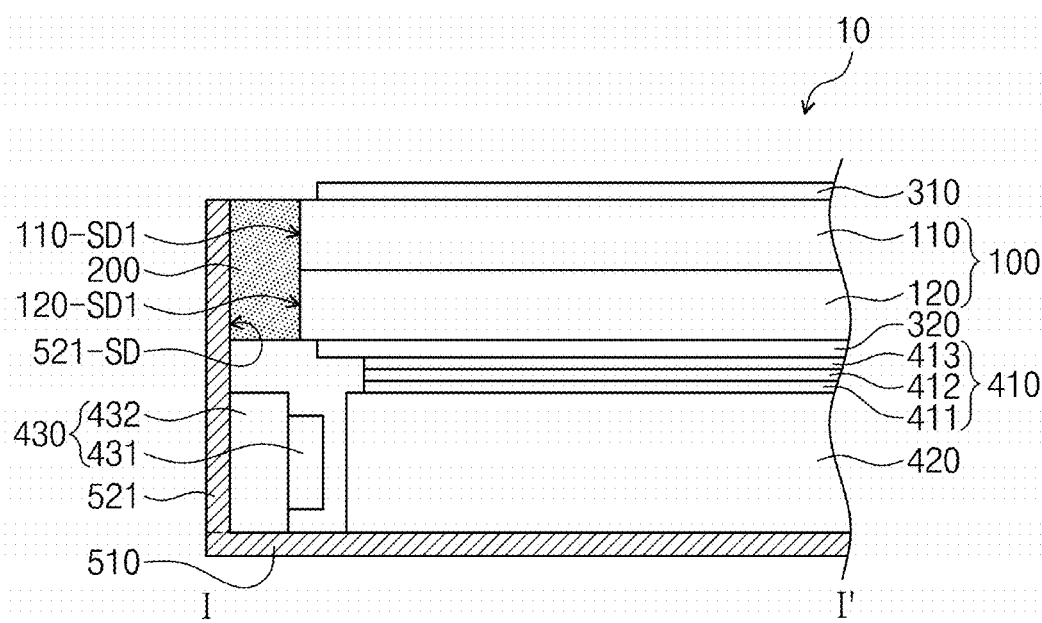
FIGS. 5 to 8 are schematic cross-sectional views of modified embodiments of the display apparatus taken along line I-I' of FIG. 2 according to the invention.

Referring to FIG. 5, in a display apparatus 10 according to an embodiment of the invention, one or more portion of a collective side wall part 520 of a bottom chassis 500 may extend adjacent to a side surface of a display panel 100.

The collective side wall part 520 may include a first side wall part 521 extending from the bottom part 510 to be disposed adjacent to the first side surface SD-1 of the display panel 100. FIG. 5 exemplarily illustrates an example in which the first side wall part 521 extends to be disposed adjacent to the first side surface SD-1 and outside the side sealing member 200, but the invention is not limited thereto. In an embodiment, the collective side wall part 520 may include a second side wall part (522 of FIG. 2) extending to be disposed adjacent to a second side surface (SD-2 of FIG. 1B), a third side wall part (523 of FIG. 2) extending to be disposed adjacent to a third side surface (SD-3 of FIG. 1B) and/or a fourth side wall part (524 of FIG. 2) extending to be disposed adjacent to a fourth side surface (SD-4 of FIG. 1B).

A side sealing member 200 may be provided between the extended first side wall part 521 and the first side surface SD-1 of the display panel 100. The side sealing member 200 may contact an inner surface 521-SD of the first wall part 521 and may contact the first side surface SD-1 of the display panel 100 to thereby cover the first side surface SD-1. FIG. 5 exemplarily illustrates the side sealing member 200 contacts each of a first side surface 110-SD1 of a first substrate 110 and a first side surface 120-SD1 of a second substrate 120 and thereby covers each of the first side surface 110-SD1 of the first substrate 110 and the first side surface 120-SD1 of the second substrate 120, but the invention is not limited thereto. In an embodiment, the side sealing member 200 may have a shape in which the side sealing member 200 contacts only one among the first side surface 110-SD1 of the first substrate 110 and the first side surface 120-SD1 of the second substrate 120 and thereby covers only one of the first side surface 110-SD1 of the first substrate 110 and the first side surface 120-SD1 of the second substrate 120, or covers a portion of the first side surface 110-SD1 of the first substrate 110 and/or the first side surface 120-SD1 of the second substrate 120.

Figure 6:
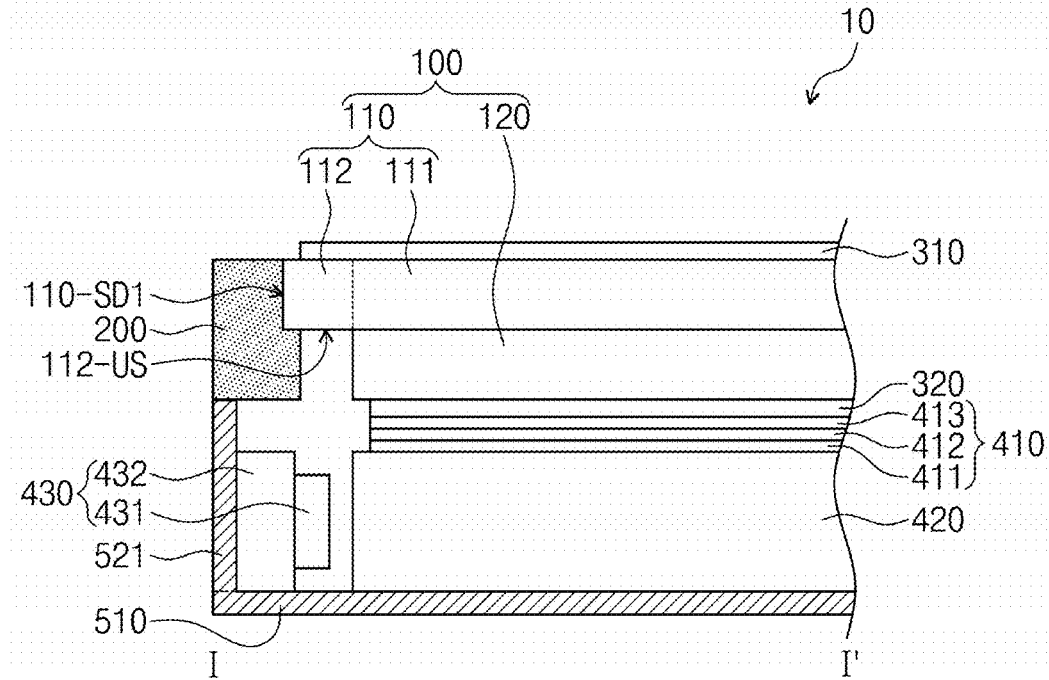

Referring to FIG. 6, a first substrate 110 of a display panel 100 may include or define a first substrate part (or portion) 111 and a second substrate part (or portion) 112. The first and second substrate parts 111 and 112 define an entirety of the first substrate 110.

The first substrate part 111 may overlap a second substrate 120 of the display panel 100 in the top plan view. The second substrate part 112 may not overlap the second substrate 120 in the top plan view. The second substrate part 112 may have a shape surrounding the first substrate part 111, such as being disposed at one or more of first to fourth side surfaces of the first substrate part 111. Accordingly, the first substrate 110 may have a total planar area greater than that of the second substrate 120 in the top plan view. The first substrate 110 may include the second substrate part 112 exposed outside an outer edge of the second substrate 120 at an edge area of the display panel 100.

In the illustrated embodiment, a side sealing member 200 may contact a first side surface 110-SD1 of the first substrate 110 to thereby cover the first side surface 110-SD1. The side sealing member 200 may have a shape which is spaced apart from the first substrate part 111 of the first substrate 110 and contacts a portion of a lower surface 112-US of the first substrate 110 at the second substrate part 112 thereof, to thereby cover the portion of the lower surface 112-US in the top plan view. The side sealing member 200 may be spaced apart from the second substrate 120 of the display panel 100. To cover the first side surface 110-SD1 and/or the portion of the lower surface 112-US, a planar size of a corresponding portion of the side sealing member 200 may be respectively equal to or greater than that of the first side surface 110-SD1 and/or the portion of the lower surface 112-US, such that an entirety of the planar size of the first side surface 110-SD1 and/or the portion of the lower surface 112-US faces the corresponding portion of the side sealing member 200. Further, to cover the first side surface 110-SD1 and/or the portion of the lower surface 112-US, the side sealing member 200 is disposed between the first side surface 110-SD1 and/or the portion of the lower surface 112-US through which light may be leaked and an exterior of the display apparatus 10 to block light leaked at the first side surface 110-SD1 and/or the portion of the lower surface 112-US from reaching the exterior of the display apparatus 10.

FIG. 6 exemplarily the first substrate 110 has a total planar area greater than that of the second substrate 120 in the top plan view, but the invention is not limited thereto. In another embodiment of the invention, the second substrate 120 may have a total planar area greater than that of the first substrate 110. In such a case, in the top plan view, the second substrate 120 may include a third substrate part (not show, but similar to 111) overlapping the first substrate 110 and a fourth substrate part (not shown, but similar to 112) not overlapping the first substrate 110 and exposed by an outer edge of the first substrate 110. In this case, the third and fourth substrate parts would define an entirety of the second substrate 120.

Figure 7:
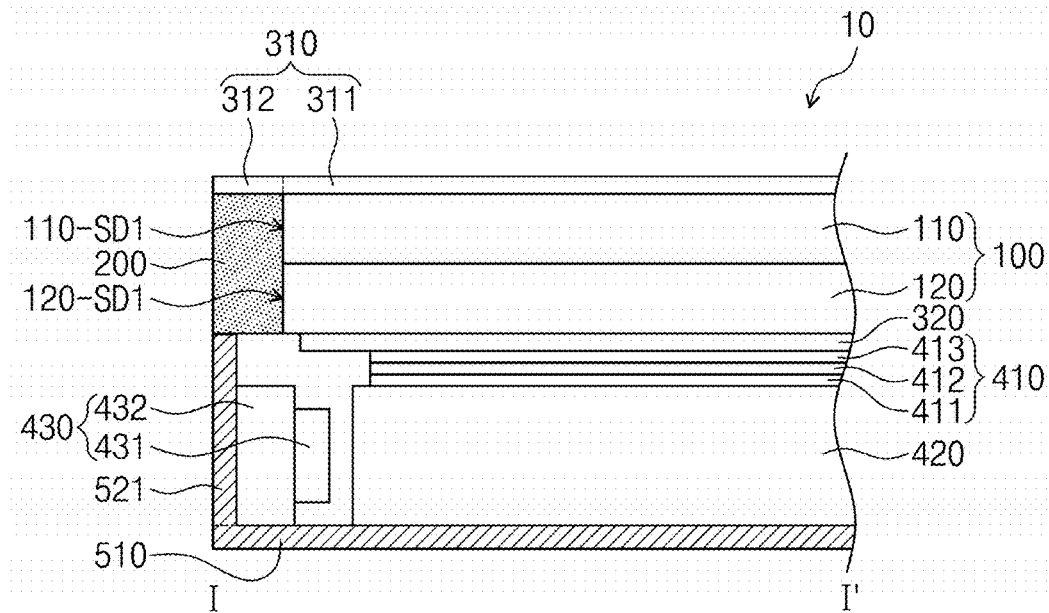

Referring to FIG. 7, a first polarizing plate 310 may include or define a first polarizing part (or portion) 311 and a second polarizing part (or portion) 312 which is extended from the first polarizing part 311.

The first polarizing part 311 may overlap a display panel 100 in the top plan view. The second polarizing part 312 may not overlap the display panel 100 in the top plan view. The second polarizing part 312 may have a shape surrounding the first polarizing part 311, such as being disposed at one or more of first to fourth side surfaces of the first substrate part 111. Accordingly, the first polarizing plate 310 may have a total planar area greater than that of the display panel 100 in the top plan view. The first polarizing plate 310 may include or define the second polarizing part 312 which is exposed outside an outer edge of the display panel 100 at an edge area thereof.

In the illustrated embodiment, a side sealing member 200 may contact a first side surface SD-1 (e.g., 110-S1 plus 120-S2) of the display panel 100 and a lower surface of the second polarizing part 312 to thereby cover the first side surface SD-1 of the display panel 100 and the lower surface of the second polarizing part 312. To cover the first side surface SD-1 and/or the lower surface of the second polarizing part 312, a planar size of a corresponding portion of the side sealing member 200 may be respectively equal to or greater than that of the first side surface SD-1 and/or the lower surface of the second polarizing part 312, such that an entirety of the planar size of the first side surface SD-1 and/or the lower surface of the second polarizing part 312 faces the corresponding portion of the side sealing member 200. Further, to cover the first side surface SD-1 and/or the lower surface of the second polarizing part 312, the side sealing member 200 is disposed between the first side surface SD-1 at which light may be leaked and an exterior of the display apparatus 10 to block light leaked at the first side surface SD-1 from reaching the second polarizing part 312 and the exterior of the display apparatus 10.

The side sealing member 200 may have a shape such that an entirety of the second polarizing part 312 is overlapped by the side sealing member 200 in the top plan view. The side sealing member 200 has a shape in which the side sealing member 200 is covered by the second polarizing part 312 in the top plan view to block the penetration of foreign substances thereto and reduce or effectively prevent contamination of the second polarizing part 312. Since the side sealing member 200 is not visible from outside the display apparatus 10 in the top plan view thereof due to the second polarizing part 312, the side sealing member 200 may have a favorable design effect.

Figure 8:
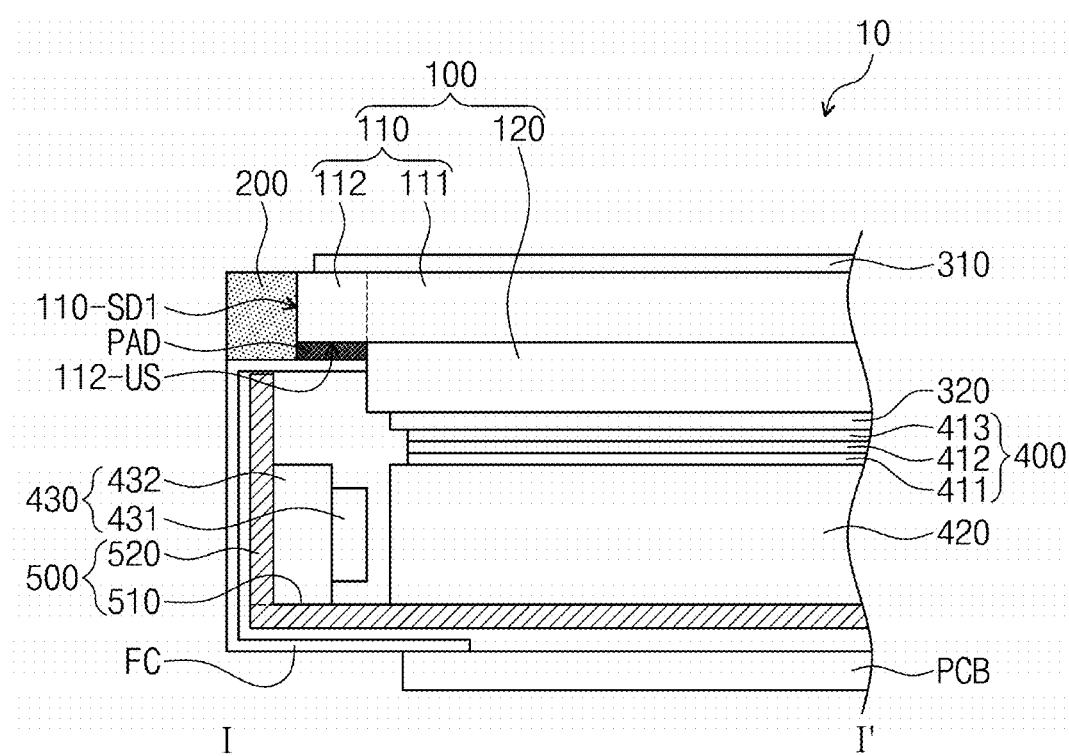

Referring to FIG. 8, a display apparatus 10 according to an embodiment of the invention may further include a flexible wiring substrate FC and a driving circuit substrate PCB.

The flexible wiring substrate FC may be attached to a display panel 100 and may be bent in a direction toward a rear surface (RS of FIG. 1B) of the display panel 100. The flexible wiring substrate FC may be attached to the rear surface (RS of FIG. 1B) of the display panel 100. A collective rear surface of the display panel 100 in FIG. 8 may be defined by a portion of the lower surface of the first substrate 110 and the lower surface of the second substrate 120. In an embodiment of the invention, the flexible wiring substrate FC may be attached to a lower surface 112-US of the first substrate 110 at a second substrate part 112 thereof. However, the invention is not limited thereto. Referring to the above discussion, for example, when a second substrate 120 has a total planar area greater than that of the first substrate 110, the flexible wiring substrate FC may be attached to a fourth substrate part of the second substrate 120.

The flexible wiring substrate FC may be attached adjacent to a first side surface (SD-1 of FIG. 1B) of the display panel 100. The flexible wiring substrate FC may be attached adjacent to a first side surface 110-SD1 of the first substrate 110. The flexible wiring substrate FC may be electrically connected to the display panel 100 through a pad part PAD. The pad part PAD may include a terminal pad which is electrically connected to a signal line which is in the display area at which an image is displayed and extends to the non-display area. In an embodiment, a pixel is defined in the display area and the terminal pad may be connected thereto by the signal line. Where the signal line and the pixel are provided in plurality, the pad part PAD may be in one-to-one correspondence to the signal lines which are electrically connected to the plurality of pixels. The flexible wiring substrate FC may be electrically connected to the pad part PAD and may receive control and/or driving signals from the driving circuit substrate PCB, for controlling and/or driving the display panel 100. Also, the flexible wiring substrate FC may transmit the received signals from the driving circuit substrate PCB to the display panel 100, such as by a conductive line or connection of the flexible wiring substrate FC. A data driving chip (not shown) may be mounted on one surface of the flexible wiring substrate FC. Among the control and/or driving signals, the data driving chip may generate a data signal which is applied to a data signal line of the display panel 100 in response to an external signal.

The driving circuit substrate PCB may be disposed on a rear surface of the display panel 100. The driving circuit substrate PCB may be electrically connected with the display panel 100 by using the flexible wiring substrate FC. Among the control and/or driving signals, the driving circuit substrate PCB may provide an image signal for displaying an image at the display area of the display panel 100 and a control signal for driving the display panel 100 to generate such image. The driving circuit substrate PCB may include a base substrate and the base substrate may be a flexible printed circuit board ("FPCB"). In this case, the base substrate may be a flexible plastic substrate, such as polyimide or polyester.

The side sealing member 200 may contact portions of the first side surface SD-1 of the display panel 100 and the flexible wiring substrate FC, and may cover the first side surface SD-1 of the display panel 100 and the flexible wiring substrate FC. In FIG. 8, the side sealing member 200 contacts the first side surface 110-SD1 of the first substrate 110 and an upper surface of the flexible wiring substrate FC, to thereby cover the first side surface 110-SD1 of the first substrate 110 and the flexible wiring substrate FC.

Figure 9A:
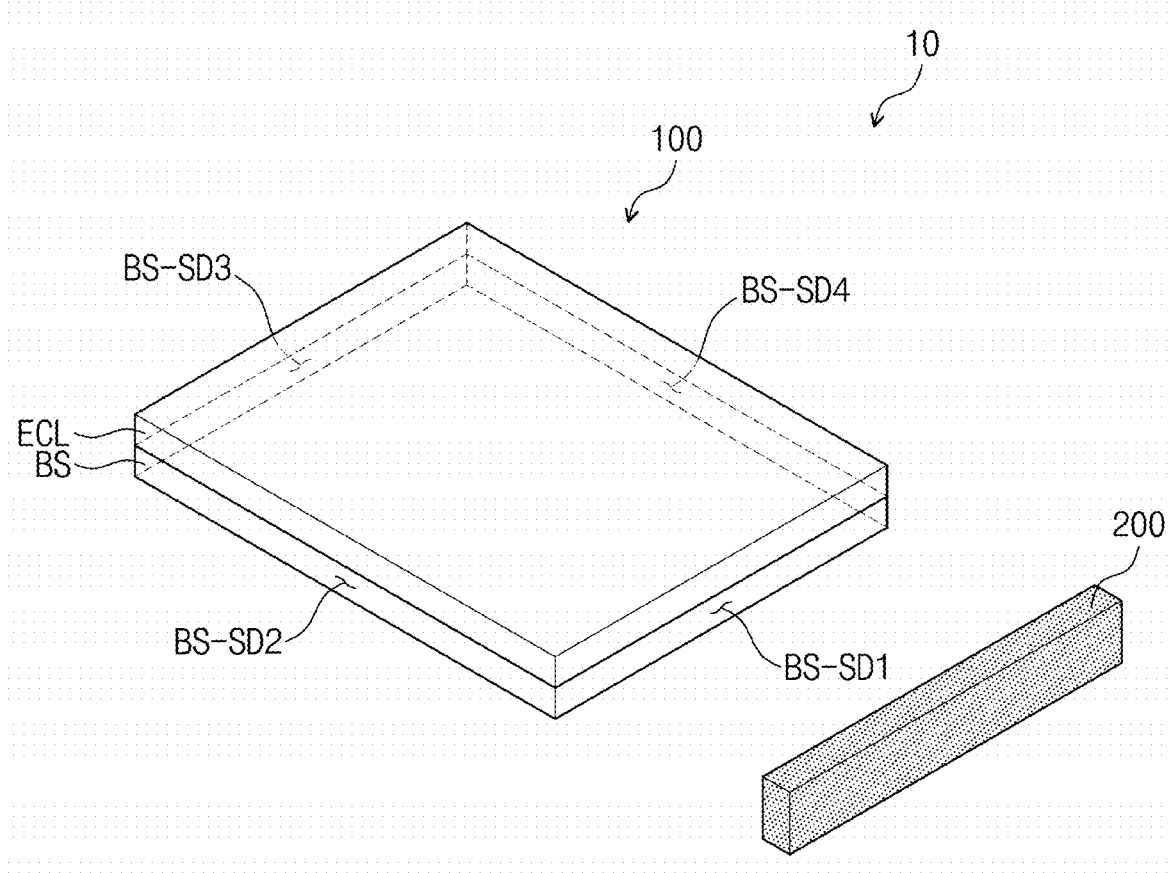
FIG. 9A is a perspective view of still another embodiment of a partial configuration of a display apparatus according to the invention.
Figure 9B:
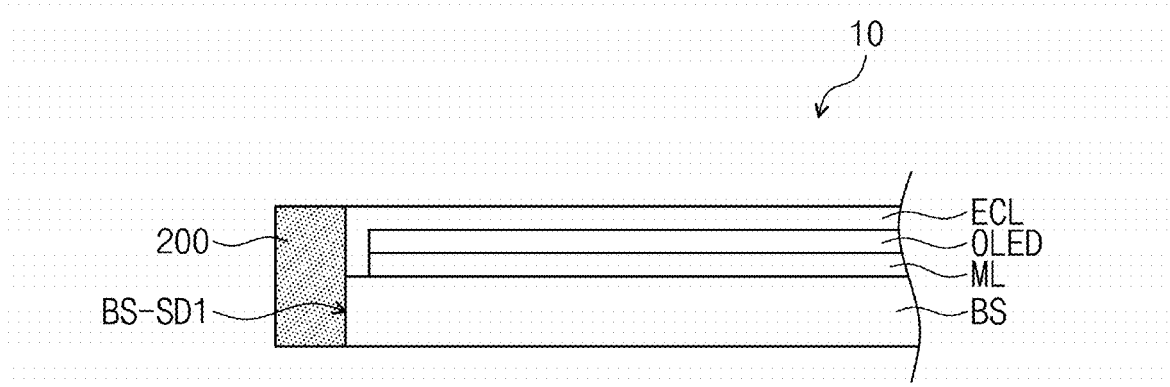
FIG. 9B is a cross-sectional view illustrating the partial configuration of the display apparatus illustrated in FIG. 9A.

FIG. 9A is a perspective view of still another embodiment of a partial configuration of a display apparatus according to the invention. FIG. 9B is a cross-sectional view illustrating the partial configuration of the display apparatus illustrated in FIG. 9A.

A display apparatus 10 may be any one of a liquid crystal display apparatus, an electro wetting display apparatus, an electrophoretic display apparatus, a micro electromechanical system ("MEMS") display apparatus, or an organic light-emitting display apparatus. In the illustrated embodiment, an organic light-emitting display apparatus will be exemplarily described.

Referring to FIGS. 9A to 9B, a display apparatus 10 according to an embodiment of the invention includes a display panel 100 and a side sealing member 200. The display panel 100 may include a base substrate BS, a circuit layer ML, an organic light-emitting device OLED, and an encapsulation layer ECL.

The base substrate BS may include at least any one of a glass substrate, a sapphire substrate or a plastic substrate. The base substrate BS may include or define a plurality of side surfaces. The base substrate BS may include a first side surface BS-SD1, a second side surface BS-SD2, a third side surface BS-SD3 and a fourth side surface BS-SD4.

The circuit layer ML may include a plurality of signal lines and electronic elements which are provided in the display panel 100. In an embodiment, the circuit layer ML may include gate lines, data lines and switching elements such as thin film transistors respectively corresponding to pixels of the display panel 100 at which an image is generated and displayed.

The organic light-emitting device OLED may generate light having a color corresponding to light-emitting materials within the organic light-emitting device OLED. The organic light-emitting device OLED may emit red light, green light and/or blue light, but the invention is not limited thereto, and the organic light-emitting device OLED may alternatively or additionally emit white light, yellow light and/or cyan light.

The encapsulation layer ECL may include a thin film encapsulation layer ("TFE"), that is, a plurality of inorganic thin films and a plurality of organic thin films collectively forming the encapsulation layer ECL. The encapsulation layer ECL may cover the organic light-emitting device OLED and may block outside environmental elements such as air and water/moisture to thereby protect the organic light-emitting device OLED. The encapsulation layer ECL may alternatively or additionally include glass.

The side sealing member 200 may contact a side surface of the base substrate BS and a side surface of the encapsulation layer ECL to thereby cover the one side surface of the base substrate BS and the side surface of the encapsulation layer ECL. Referring to FIGS. 9A and 9B, the side sealing member 200 may contact the first side surface BS-SD1 of the base substrate BS and a portion of the encapsulation layer ECL extending from the first side surface BS-SD1 in an upper direction to define the side surface of the encapsulation layer ECL, to thereby cover the first side surface BS-SD1 and the side surface of the encapsulation layer ECL.

FIGS. 9A to 9B exemplarily illustrate the side sealing member 200 contacts only a first side surface BS-SD1 of the base substrate BS, but the invention is not limited thereto. In an embodiment, the side sealing member 200 may contact one or more of the second side surface BS-SD2, the third side surface BS-SD3 and the fourth side surface BS-SD4 of the base substrate BS and may thereby respectively cover the contacted side surface among the second side surface BS-SD2, the third side surface BS-SD3 and the fourth side surface BS-SD4.

In manufacturing a conventional side sealing member for covering a side surface of a display panel, the conventional side sealing member has a relatively low elongation and thereby has a limitation in that the conventional side sealing member is cut during reprocessing and residue is generated. In particular, when the manufactured conventional side sealing member covers a portion of an electronic component, such as a flexible wiring board of a display apparatus, there is a limitation that overall reprocessing of the electronic component was required due to residue of the side sealing member or from the manufacturing thereof, and thereby, an overall manufacturing process of such display apparatus became relatively complicated, and material costs thereof were undesirably increased.

In one or more embodiment of the display apparatus according to the invention, a side sealing member for covering a side surface of a display panel has an elongation of about 100% to about 300% which is greater than those for a conventional sealing member. Thus, one or more embodiment of the side sealing member according to the invention is not additionally processed such as by cutting during reprocessing thereof in manufacturing the display apparatus, no residue is generated, and reprocessing of only the side sealing member is sufficient. Thus, for one or more embodiment of the display apparatus including the side sealing member according to the invention, an overall manufacturing process of such display apparatus is simplified, material costs are reduced and productivity of such manufacturing process is improved.

Hereinafter, the invention will be described in more detail through a specific Example 1 and a Comparative example. The examples discussed below are to help understand the invention, but the scope of the invention is not limited thereto.

Example 1

About 50 parts by weight of urethane acrylate, about 30 parts by weight of exo-1,7,7-Trimethylbicyclo[2.2.1]hept-2-yl acrylate, about 15 parts by weight of 2-Propenoicacid (tetrahydro-2-furanyl)methyl ester, about 4 parts by weight of Diphenyl (2,4,6-trimethylbenzoyl) phosphine oxide, and about 1 part by weight of acetylene black were mixed. The mixture was cured by being irradiated with light of a range about 385 nanometers (nm) to about 405 nm.

Comparative Example 1

About 50 parts by weight of urethane acrylate, about 35 parts by weight of acrylic acid isobornyl ester, about 9 parts by weight of pentaerythritol triacrylate, about 5 parts by weight of 2-methyl-4-(methylthio)-2-morpholinopropiophenone, and about 1 parts by weight of dye were mixed. The mixture was cured by being irradiated with light of a range about 360 nm to about 380 nm.

Experiment Method

With respect to each of Example 1 and the Comparative example 1, a tensile test was performed at a speed of 20 millimeters per minute (mm/min) using a universal testing machine ("UTM"), and then, elongations and peel strengths of each of Example 1 and the Comparative example 1 were measured. The test was performed by forming an American Society for Testing And Materials (ASTM) dumbbell or dog bone-shaped sample with respect to each of Example 1 and Comparative example 1. In addition, with respect to each of Example 1 and Comparative example 1, a tensile test of a sample having the width of about 1 millimeter (mm) and the length of about 10 millimeters (mm) using a push-pull gage, and then, the shear adhesion strength of each of Example 1 and Comparative example 1 were measured.

Experimental Result

TABLE 1

|  | Elongation (%) | Peel strength (N/m) | | Shear adhesion strength (N/mm$^2$) |
| --- | --- | --- | --- | --- |
|  |  | Right after curing | After 4 hours |  |
| Example 1 | 200 | 1940 | 1734 | 8.13 |
| Comparative example 1 | 50 | 725 | 804 | 7.06 |

Referring to Table 1, it may be verified that in comparison with Comparative example 1, the elongation was about 4 times greater, and the peel strengths measured right after curing and after 4 hours were about 2 times greater or more in Example 1. It may be verified that in comparison with Comparative example 1, the shear adhesion strength was 115% or more that in Example 1.

Each of side sealing members formed in Example 1 and Comparative example 1 was applied to a side surface of a display panel and a portion of a flexible wiring board, and then was removed for reprocessing. Then, the status of residue was observed for each of Example 1 and Comparative example 1, with reference to FIGS. 10A to 11D.

Figure 10A:
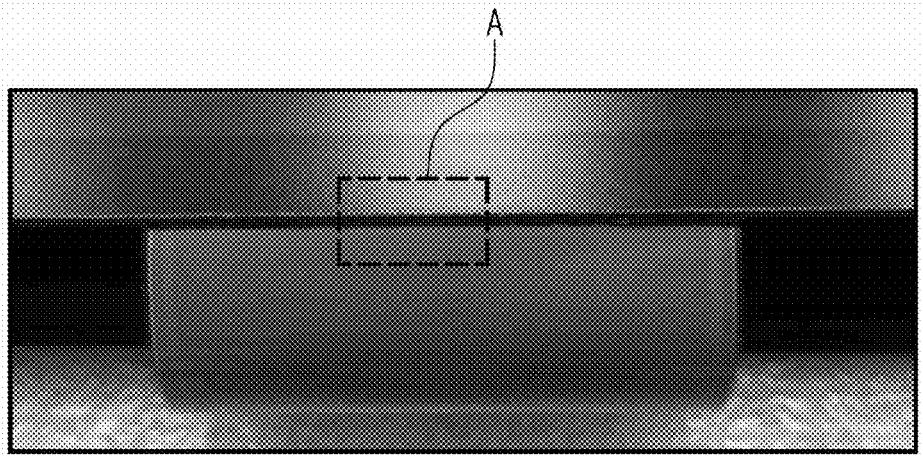
FIG. 10A is a view capturing a display panel and a flexible wiring board to which a side sealing member formed in Comparative example 1.
Figure 10B:
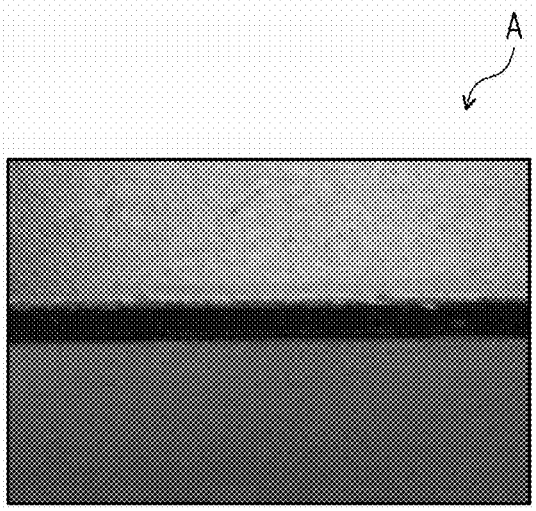
FIG. 10B is an enlarged view of portion A of FIG. 10A.
Figure 10C:
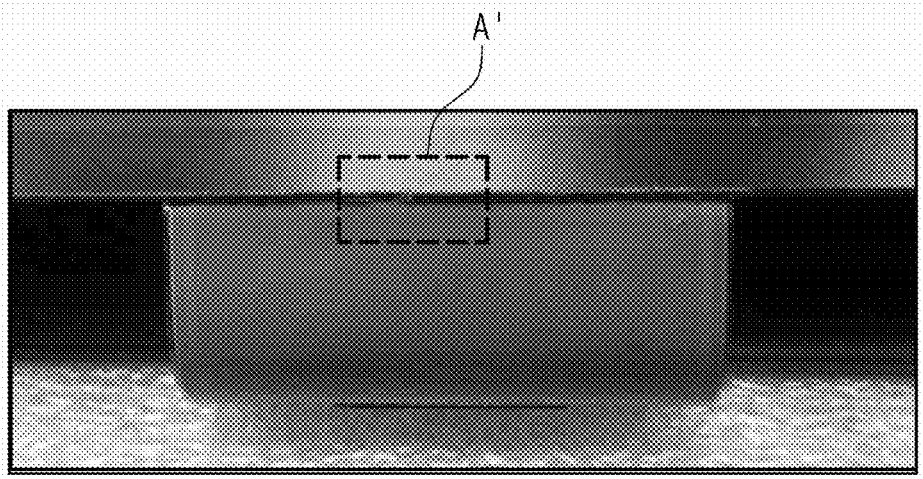
FIG. 10C is a view capturing a display panel and a flexible wiring board after a side sealing member formed in Comparative example 1 is removed.
Figure 10D:
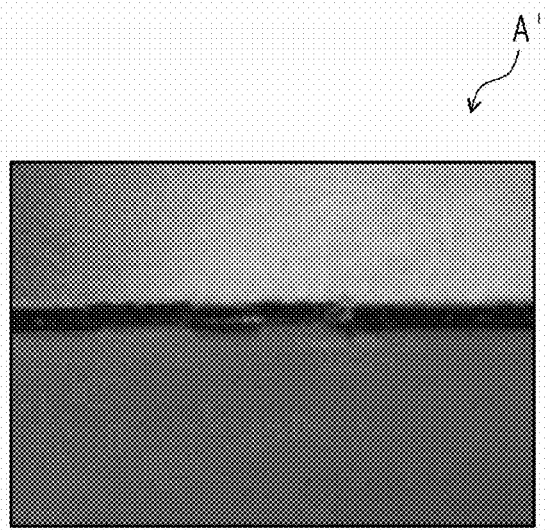
FIG. 10D is an enlarged view of portion A' of FIG. 10B.

FIG. 10A is a view capturing the display panel and the flexible wiring board to which the side sealing member formed in Comparative example 1 was applied. FIG. 10B is an enlarged view of portion A of FIG. 10A. FIG. 10C is a view capturing the display panel and the flexible wiring board after the side sealing member formed in Comparative example 1 is removed therefrom. FIG. 10D is an enlarged view of portion A' of FIG. 10B. Referring to FIGS. 10A to 10D, it may be verified that when the side sealing member formed in Comparative example 1 was applied to a side surface of the display panel and a portion of the flexible wiring board (FIGS. 10A and 10B) and then was removed for reprocessing (FIGS. 10C and 10D), material of the side sealing member was not completely removed from the side surface of the display panel and the portion of the flexible wiring board such that residue from the side sealing member undesirably remained at the display panel and/or the flexible wiring board.

Figure 11A:
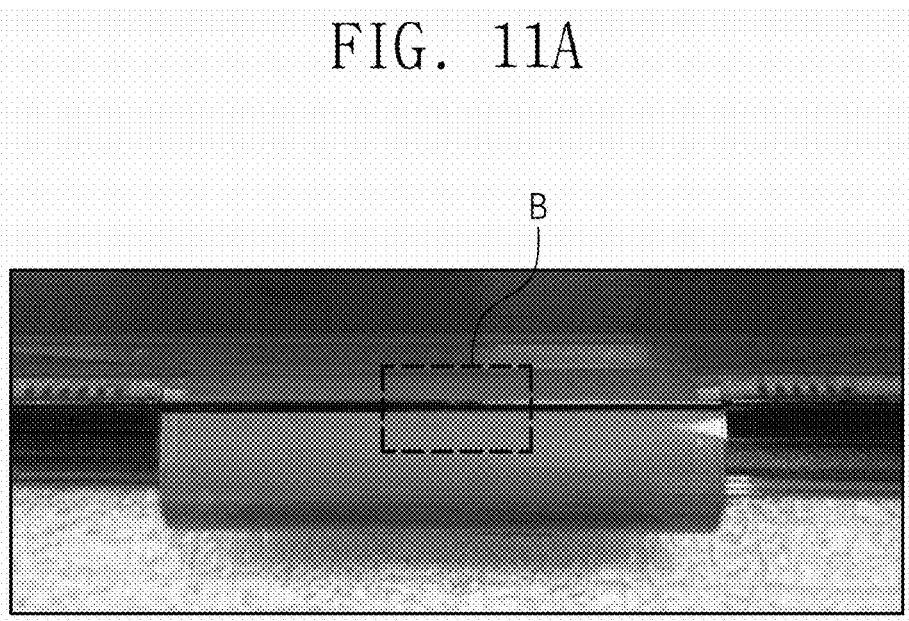
FIG. 11A is a view capturing a display panel and a flexible wiring board to which a side sealing member formed in Example 1.
Figure 11B:
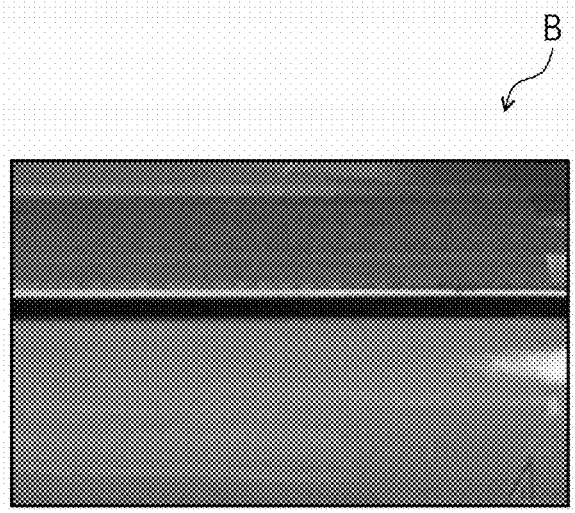
FIG. 11B is an enlarged view of portion B of FIG. 11A.
Figure 11C:
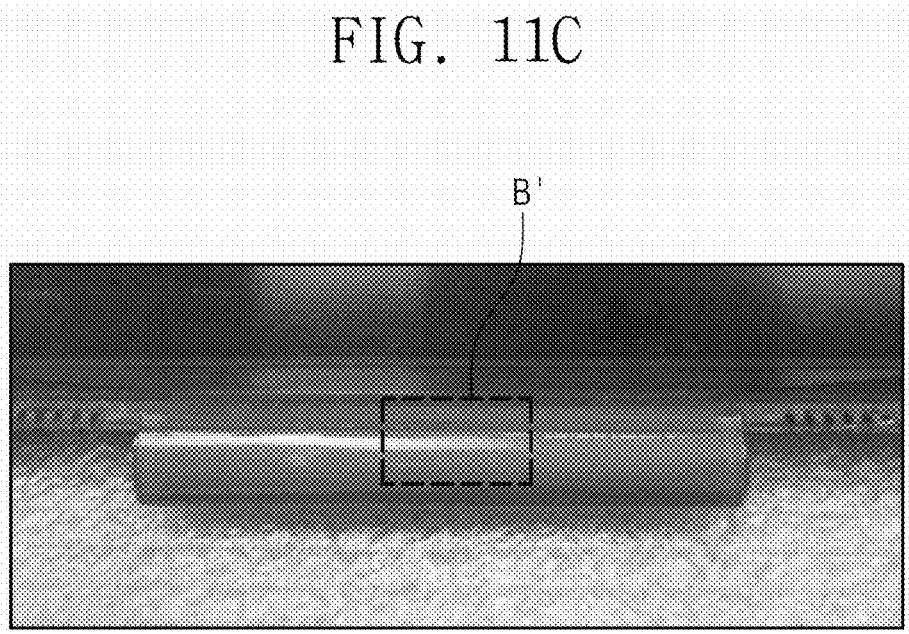
FIG. 11C is a view capturing a display panel and a flexible wiring board after a side sealing member formed in Example 1 is removed.
Figure 11D:
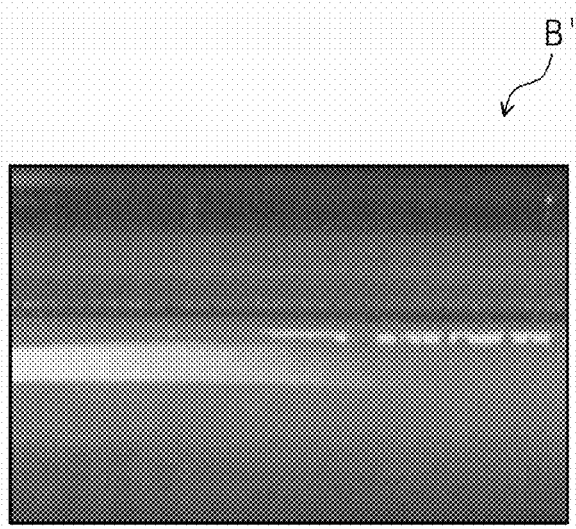
FIG. 11D is an enlarged view of portion B' of FIG. 11C.

FIG. 11A is a view capturing the display panel and the flexible wiring board to which the side sealing member formed in Example 1 was applied. FIG. 11B is an enlarged view of portion B of FIG. 11A. FIG. 11C is a view capturing the display panel and the flexible wiring board after the side sealing member formed in Example 1 is removed therefrom. FIG. 11D is an enlarged view of portion B' of FIG. 11B. Referring to FIGS. 11A to 11D, it may be verified that when the side sealing member formed in Example 1 was applied to a side surface of the display panel and a portion of the flexible wiring board (FIGS. 11A and 11B) and then was removed for reprocessing (FIGS. 11C and 11D), material of the side sealing member was completely removed from the side surface of the display panel and the portion of the flexible wiring board. Through such results, it may be understood that in one or more embodiment of a display apparatus according to the invention, material of a side sealing member is completely removable during reprocessing of a manufacturing method, overall reprocessing of electronic components, such as a flexible wiring board during the manufacturing method may be reduced or effectively prevented. In the manufacturing method of such display apparatus, only the reprocessing of the side sealing member may thereby be performed, and thus, material and manufacturing costs and productivity are improved.

One or more embodiment of a display apparatus according to the invention and the manufacturing method thereof provides improved productivity to thereby reduce material costs and overall manufacturing costs.

The above-disclosed subject matter is to be considered illustrative and not restrictive, and the appended claims are intended to cover all such modifications, enhancements, and other embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description. Therefore, the above-described embodiments are illustrative in all the aspects, and should be construed as not being limitative.

What is claimed is:

1. A display apparatus comprising:
   a display panel; and
   a side sealing member which is removably disposed in contact with a side surface of the display panel,
   wherein the side sealing member which is removably disposed in contact with the side surface of the display panel, has an elongation of about 100% to about 300% inclusive and comprises based on 100 parts by weight of the side sealing member:
   an oligomer comprising a urethane group in an amount of about 45 to about 60 parts by weight;
   a first monomer comprising an isobornyl group in an amount about 25 to about 40 parts by weight;
   a second monomer which defines the elongation of about 100% to about 300% inclusive and is different from the first monomer, the second monomer comprising a furfuryl group in an amount about 5 to about 20 parts by weight, and
   a third monomer different from each of the first and second monomers and comprising a phosphineoxide group in an amount of about 1 to about 5 parts by weight.

2. The display apparatus of claim 1, wherein
   the display panel comprises:
   a display surface at which an image is displayed;
   a rear surface facing the display surface; and
   the side surface connecting the display surface and the rear surface to each other,
   the side surface is provided in plural and includes a first side surface, a second side surface, a third side surface and a fourth side surface, and
   the side sealing member which has the elongation of about 100% to about 300% inclusive, is removably disposed in contact with each of the first side surface, the second side surface, the third side surface and the fourth side surface and respectively covers each of the first side surface, the second side surface, the third side surface and the fourth side surface.

3. The display apparatus of claim 1, wherein within the side sealing member which has the elongation of about 100 to about 300 inclusive and is removably disposed in contact with the side surface of the display panel,
the first monomer comprises isobornyl acrylate,
the second monomer comprises tetrahydrofurfuryl acrylate, and
the third monomer comprises diphenyltrimethylbenzoyl phosphineoxide.

4. The display apparatus of claim 1, wherein the side sealing member which has the elongation of about 100% to about 300% inclusive and is removably disposed in contact with the side surface of the display panel further comprises carbon black.

5. The display apparatus of claim 1, wherein the side sealing member which has the elongation of about 100% to about 300% inclusive, is removably disposed in contact with the side surface of the display panel and has a peel strength of about 1600 N/m to about 2100 N/m.

6. The display apparatus of claim 1, wherein the side sealing member which has the elongation of about 100% to about 300% inclusive, is removably disposed in contact with the side surface of the display panel and has a shear adhesion strength of about 7.5 N/mm$^2$ to about 9 N/mm$^2$.

7. The display apparatus of claim 1, further comprising a bottom chassis in which the display panel is accommodated, wherein:
the bottom chassis includes:
a bottom portion parallel to the display panel; and
a side wall extending from the bottom portion,
wherein the side wall includes a first side wall portion, a second side wall portion, a third side wall portion, and a fourth side wall portion, and
the side sealing member which has the elongation of about 100% to about 300% inclusive and is removably disposed in contact with the side surface of the display panel, is between the side surface of the display panel and an inner surface of the first side wall portion and contacts the side surface of the display panel and the inner surface of the first side wall portion to cover the side surface of the display panel and a portion of the inner surface of the first side wall portion.

8. The display apparatus of claim 1, further comprising:
a first polarizing plate on a display surface of the display panel at which an image is displayed; and
a second polarizing plate on a rear surface of the display panel which opposes the display surface thereof,
wherein
in a top plan view, the first polarizing plate includes:
a first polarizing portion overlapping the display panel; and
a second polarizing portion extended from the first polarizing portion and not overlapping the display panel, and
the side sealing member which has the elongation of about 100% to about 300% inclusive and is removably disposed in contact with the side surface of the display panel, is further contacted by the second polarizing portion.

9. The display apparatus of claim 1, wherein the display panel comprises:
a base substrate;
an organic light-emitting device on the base substrate; and
an encapsulation layer on the organic light-emitting device,
wherein
the base substrate includes a first side surface, a second side surface, a third side surface and a fourth side surface, and
the first side surface of the base substrate and a portion of the encapsulation layer collectively define the side surface of the display panel with which the side sealing member is removably disposed in contact.

10. The display apparatus of claim 1, wherein the display panel comprises:
a display surface at which an image is displayed;
a rear surface facing the display surface; and
the side surface connecting the display surface and the rear surface to each other,
wherein
the side surface of the display panel and a contacting surface of the side sealing member which is removably disposed in contact with the side surface of the display panel each includes a length thereof extended in a first direction and a height thereof extended in a thickness direction of the display panel, and
a planar area of the contacting surface defined by the length and the height of the side sealing member is equal to or greater than a planar area of the side surface defined by the length and the height of the side surface of the display panel.

11. The display apparatus of claim 1, wherein the side sealing member which is removably disposed in contact with the side surface of the display panel defines an outer surface of the display apparatus.

12. A display apparatus comprising:
a display panel comprising a glass substrate; and
a side sealing member which is removably disposed in contact with a side surface of the glass substrate of the display panel,
wherein the side sealing member which is removably disposed in contact with the side surface of the glass substrate of the display panel, has an elongation of about 100% to about 300% inclusive, and comprises based on 100 parts by weight of the side sealing member;
an oligomer comprising a urethane group is an amount of about 45 to about 60 parts by weight;
a first monomer comprising an isobornyl group in an amount about 25 to about 40 parts by weight;
a second monomer which defines the elongation of about 100% to about 300% inclusive and is different from the first monomer, the second monomer comprising a furfuryl group in an amount of about 5 to about 20 parts by weight, and
a third monomer different from each of the first and second monomers and comprising a phosphineoxide group in an amount of about 1 to about 5 parts by weight.

13. The display apparatus comprising:
a display panel; and
a side sealing member which is removably disposed in contact with a side surface of the display panel,
wherein
the side sealing member which is removably disposed in contact with the side surface of the display panel, has an elongation of about 100% to about 300% inclusive, and comprises based on 100 parts by weight of the side sealing member;
an oligomer comprising a urethane group is an amount of about 45 to about 60 parts by weight;

a first monomer comprising an isobornyl group in an amount about 25 to about 40 parts by weight;

a second monomer which defines the elongation of about 100% to about 300% inclusive and is different from the first monomer, the second monomer comprising a furfuryl group in an amount of about 5 to about 20 parts by weight, and a third monomer different from each of the first and second monomers and comprising a phosphineoxide group in an amount of about 1 to about 5 parts by weight; and the display panel comprises:

a first substrate which defines a display surface of the display panel at which an image is displayed; and a second substrate which is on the first substrate and defines a rear surface of the display panel opposite to the display surface thereof, wherein the first substrate includes an upper surface, a lower surface facing the upper surface, and a first side surface, a second side surface, a third side surface and a fourth side surface each connecting the upper and lower surfaces of the first substrate to each other, the second substrate includes an upper surface, a lower surface facing the upper surface, and a first side surface, a second side surface, a third side surface and a fourth side surface each connecting the upper and lower surfaces of the second substrate to each other, and the side sealing member which has the elongation of about 100% to about 300% inclusive, is removably disposed in contact with at least one of the first side surface of the first substrate and the first side surface of the second substrate to cover the first side surface of the first substrate and the first side surface of the second substrate.

14. The display apparatus of claim 13, wherein in a top plan view, the first side surface of the first substrate and the first side surface of the second substrate are at a same side of the display panel, the first substrate comprises:

a first substrate portion overlapping the second substrate; and a second substrate portion extended from the first substrate portion, in a direction away from the first side surface of the second substrate, and not overlapping the second substrate, the second substrate portion defining the first side surface of the first substrate, the first side surface of the first substrate being spaced apart from the first side surface of the second substrate, and the side sealing member which has the elongation of about 100% to about 300% inclusive and is removably disposed in contact with the side surface of the display panel, is spaced apart from the first substrate portion and contacts the first side surface of the first substrate to cover the first side surface of the first substrate.

15. The display apparatus of claim 14, further comprising a flexible wiring substrate attached to the second substrate portion of the first substrate, wherein in the top plan view, the side sealing member which has the elongation of about 100% to about 300% inclusive and is removably disposed in contact with the side surface of the display panel, further covers a portion of the flexible wiring substrate attached to the second substrate portion of the first substrate.

* * * * *